Patented Dec. 25, 1951

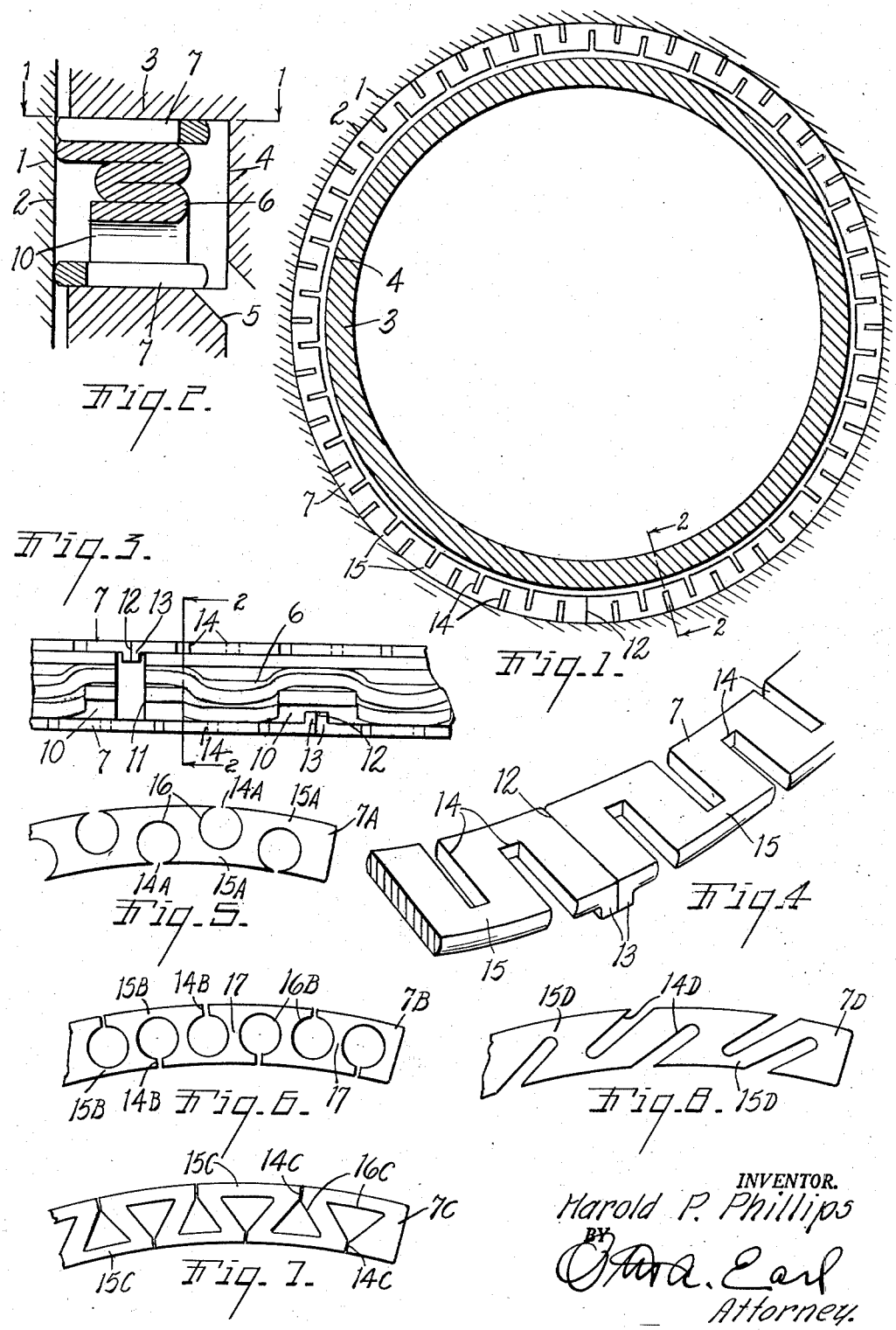

2,579,698

UNITED STATES PATENT OFFICE 2,579,698

PISTON RING

Harold P. Phillips, Hastings, Mich., assignor to Hastings Manufacturing Company, Hastings, Mich.

Application November 24, 1947, Serial No. 787,671

3 Claims. (Cl. 309—45)

This invention relates to improvements in piston ring assemblies and ring elements therefor.

The main objects of this invention are:

First, to provide a piston ring assembly which is radially flexible and when installed under expansible stress so as to conform closely to irregularities in the shape of the cylinder in which it is installed.

Second, to provide a piston ring assembly having cylinder wall engaging elements which are annularly and radially compressible to provide radial spring thrust in all portions of the periphery of the elements regardless of irregularities in the shape of the cylinder within which the ring operates.

Third, to provide a cylinder wall engaging element having inherent expansibility when installed and on which may be deflected radially at one or more points along its circumference without materially effecting the radially directed spring thrust of the element adjacent to the deflected portions.

Fourth, to provide a cylinder wall engaging element which may be economically formed of ribbon steel coiled edgewise and when installed, has the desired expanding thrust without the use of expanders.

Fifth, to provide a piston ring assembly of the type described which is particularly well adapted to function as an oil ring in an internal combustion engine to wipe excess oil from the cylinder walls and direct the oil to return passages in the piston on which the ring is installed.

Other objects and advantages pertaining to the details and economies of my invention will be apparent from a consideration of the following description and claims.

The drawings, of which there is one sheet, illustrate a preferred form of my piston ring as installed in the piston of an internal combustion engine and four modified forms of cylinder wall engaging elements adaptable for use with my piston ring.

Fig. 1 is a transverse cross sectional view through the cylinder and piston of an internal combustion engine and along the line 1—1 in Fig. 2 illustrating my piston ring assembly in operative position.

Fig. 2 is a fragmentary vertical cross sectional view along the line 2—2 in Figs. 1 and 3.

Fig. 3 is an enlarged fragmentary edge elevational view of my piston ring assembly.

Fig. 4 is a fragmentary perspective view of a portion of a cylinder wall engaging element of my invention.

Figs. 5, 6, 7 and 8 are fragmentary plan views of modified forms of wall engaging elements.

The drawings illustrate a portion of a cylinder block 1 defining a cylindrical cylinder bore 2 within which a piston 3 is arranged to reciprocate. The piston defines an annular ring groove 4 within which my piston ring is mounted. Preferably the piston is provided with a plurality of inwardly and downwardly inclined bores 5 (see Fig. 2) through which oil collected from the cylinder wall by the piston ring may be returned to the center of the piston and from there to the crank case of the engine.

The piston ring assembly illustrated comprises the annular spacer member 6 and upper and lower wall engaging ring elements 7. The spacer illustrated is that described in my Patent No. 2,404,862, issued July 30, 1946, and will therefor not be described in detail herein except to bring out relationship to the cylinder wall contacting ring elements. It is believed to be sufficient to note that the spacer is provided on one side with drain recesses 10 and that the ends are spaced at 11. The wall engaging ring elements 7 are of identical construction so that only one will be described. These ring elements are preferably formed of a flat strip of ribbon steel coiled edgewise, the ring elements being split at 12.

In the preferred embodiment illustrated, the ends of the ring elements are turned axially to provide widened abutments 13 increasing the thrust engaging area between the ends of the ring elements when they are installed in a cylinder under compression and with the ends in abutting relation.

The ring elements 7 are alternately slotted from the inside and the outside as at 14, the slots exceeding one half the radial width of the ring so as to provide a series of radially bendable peripheral segments connecting the unslotted portions of the ring.

In installing the assembly on a piston, the lower wall engaging element 7 is spread at its split and slipped over the piston and into the ring groove, being in generally circular shape when the abutments 13 are in engagement. The spacer member 6 is then inserted into the groove with the flanges 13 of the installed ring disposed within one of the recesses 10 of the spacer member. The upper ring element 7 is then installed with its abutment flanges disposed in the gap 11 of the spacer. Thus, the spacer member holds the wall engaging elements properly spaced axially while the inherent resilience of the ring elements urges them outwardly to engagement with the cylinder. As the wall engaging elements are sufficiently larger than the cylinder bore when uncompressed in which they are to operate, when installed in the cylinder the ends of the ring elements are in engagement with the result that the spring portions 15 are placed under compressive force and spring tension.

Should the cylinder wall within which the ring is installed have or receive a slightly out-of-round contour due to engine wear, that segment of the ring element functioning in the out-of-round portion of the cylinder will deflect outwardly by reason of flexing of the bendable portions 15 to maintain the periphery of the element in engagement with the cylinder wall completely therearound. It will be noted that due to the location of the recesses 10 in the lower face of the spacer ring and the gap 11, the outwardly opening slots in one of the rings 7 will be overlapped by the unslotted portions of the other ring 7. Thus continuous sealing engagement is obtained between the cylinder wall and the two ring elements completely around the periphery of the piston.

The modified form of wall engaging ring 7A illustrated in Fig. 5 consists of a flat annular ring of metal preferably formed of ribbon steel coiled edgewise having a series of apertures 16 punched therethrough. Alternate apertures 16 are displaced inwardly and outwardly of the ring 7A so as to form slots or openings 14A to the inner and outer edges of the ring. The apertures 16 are sufficiently large to cut away over one-half of the radial width of the ring and leave the bending portions 15A opposite each of the slots 14A.

The modified form of ring 7B is provided with a series of apertures 16B which are centered radially within the ring 7B so as to leave approximately equal borders on each edge of the ring. The borders of adjacent apertures 16B are cut away or slotted on opposite sides as at 14B to provide segmental edges for the ring with the center of each section having a radially bendable portion 15B of reduced cross section on the opposite side of each aperture from the slot opening thereto. The apertures 16B are of such a size and spacing as to provide circumferentially or tangentially bendable positions 17 of approximately the same width as the radially bendable portions 15B.

The modified form of ring 7C illustrated in Fig. 7 consists of a flat annular ring of metal having a series of oppositely arranged triangular apertures 16C punched therein. The apex of each triangular aperture is connected to the adjacent edge of the ring by slots 14C, the edges of which are in abutting relationship when the ring is compressed. That portion of the ring along the base of each triangular aperture forms a radially bendable portion 15C so that the ring can be deflected throughout any portion of its circumference to conform to the shape of the cylinder wall.

The modified form of ring 7D illustrated in Fig. 8 consists of an annular ring of thin metal in which the radially bendable portions 15D are formed by the oblique slots 14D extending alternately from the inner and outer edges of the ring.

All forms of the cylinder wall engaging rings illustrated provide in effect a series of separate segmental wall engaging portions along their periphery which are radially bendable in their center and separated by the various types of slots and apertures described. Thus formed, one or more of the wall engaging segments may be deflected out of a true circle without materially effecting the circular contour of the remaining portion of the ring. Deviation from the circular alignment of the several segments is accommodated by the bending of the radially bending portions 15 without interfering with the annular or circumstantial compressive force applied to the entire ring by compressing it into the cylinder bore. My ring is thus well adapted to maintain a constant and uniform radial wall engaging pressure on all portions of a cylinder wall regardless of irregularities in the cylinder wall shape.

The ring elements 7 are desirably formed of ribbon steel of a gage approximating twenty-four one thousandths of an inch in thickness. The thrust abutments 13 are desirable in view of the relative thinness of the stock but with a suitable spacer, satisfactory results can be had without these abutment flanges.

I have not attempted in the accompanying drawing to illustrate clearances and tolerances and I have not attempted to show the parts in their relative proportions. It will be understood that in practice these may vary considerably, depending on the diameter of the ring as well as the axial width of the piston ring groove. The requirement for tolerances and clearances is understood by those skilled in the art.

I have thus described several highly practical forms of my piston ring so that others may reproduce the same or similar rings without further description.

Having thus described my invention, what I claim as new and desire to secure by Letters Patent, is:

1. A piston ring assembly comprising an annular split spacer member having spaced drain recesses in one side thereof, and a pair of flat annular split cylinder wall engaging ring elements positioned one on each side of the spacer member, said ring elements being formed of ribbon steel coiled edgewise and having abutment flanges on their ends, the abutment flanges of each ring member retainingly engaging each other under the compressional stress of the ring member when operatively engaging the cylinder wall, the flanges of one element being positioned in one of said drain recesses and the flanges of the other element being disposed within the gap of the spacer member, the abutting engagement of the end portions of the last mentioned element closing the gap of the spacer element and the flanges thereof retaining said end portions in closing relation to said gap, said ring elements being alternately recessed from the inner and outer edges thereof, the recesses extending over one-half of the radial width of the ring elements providing springable portions between the recesses where the ring elements are under expanding stress when compressed within a cylinder with the said flanges in abutting relation, said ring elements when the abutment flanges thereof are in abutting engagement with each other and before compression of the ring elements into a piston ring groove, being of a diameter greater than that of the cylinder wall with which they cooperate.

2. A piston ring assembly comprising an annular split spacer member having spaced drain recesses in one side thereof, and a pair of flat annular split cylinder wall engaging ring elements positioned one on each side of the spacer member, said ring elements being formed of ribbon steel coiled edgewise and having axially disposed abutment flanges on their ends, the abutment flanges of each ring member retainingly engaging each other under the compressional stress of the ring member when operatively engaging the cylinder wall, the flanges of one element being positioned within the gap of the spacer member, the abutting engagement of the end portions of the last mentioned element closing the gap of the spacer element and the flanges thereof retaining said end portions in closing relation to said gap, said ring elements being radially and alternately slotted from the inner and outer edges thereof, the slots extending over one-half of the radial width of the ring elements providing segmental springable portions bridging the ends of the slots, said ring elements when the abutment flanges thereof are in abutting engagement with each other and before compression of the ring elements into a piston ring groove, being of a diameter greater than that of the cylinder wall with which they cooperate.

3. A piston ring assembly comprising an annular split spacer member, and a pair of flat annular split cylinder wall engaging ring elements positioned one on each side of the spacer member, said ring elements being formed of ribbon steel coiled edgewise, said ring elements being alternately recessed from the inner and outer edges thereof, the recesses extending over one-half of the radial width of the ring elements providing springable portions between the recesses where the ring elements are under expanding stress when compressed within a cylinder with the ends thereof in abutting relation, said ring elements when the ends thereof are in end abutting engagement and before compression of the ring elements into a piston ring groove, being of a diameter greater than that of the cylinder wall with which they cooperate, said ring element closing the gap of the spacer member.

HAROLD P. PHILLIPS.

REFERENCES CITED

The following references are of record in the file of this patent:

UNITED STATES PATENTS

| Number | Name | Date |
|---|---|---|
| 1,457,461 | Renshaw | June 5, 1923 |
| 1,881,849 | Morton | Oct. 11, 1932 |
| 2,076,542 | Bowers | Apr. 13, 1937 |
| 2,262,311 | Zahodiakin | Nov. 11, 1941 |
| 2,278,019 | Phillips | Mar. 31, 1942 |
| 2,404,862 | Phillips | July 30, 1946 |

FOREIGN PATENTS

| Number | Country | Date |
|---|---|---|
| 123,352 | Great Britain | Feb. 17, 1919 |